（12） United States Patent
Schneider et al.

(10) Patent No.: US 7,145,129 B2
(45) Date of Patent: Dec. 5, 2006

(54) METHOD FOR OPTIMIZING PERFORMANCE OF OPTICAL ENCODERS OPERATING IN A FLUID

(75) Inventors: John K Schneider, Snyder, NY (US); Stephen M Gojevic, Buffalo, NY (US); Jack C Kitchens, Buffalo, NY (US)

(73) Assignee: Ultra-Scan Corporation, Amherst, NY (US)

( * ) Notice: Subject to any disclaimer, the term of this patent is extended or adjusted under 35 U.S.C. 154(b) by 0 days.

(21) Appl. No.: 11/139,710

(22) Filed: May 27, 2005

(65) Prior Publication Data

US 2005/0218352 A1    Oct. 6, 2005

Related U.S. Application Data

(62) Division of application No. 10/314,071, filed on Dec. 6, 2002, now Pat. No. 6,900,428.

(51) Int. Cl.
*G01D 5/34* (2006.01)
*H01J 3/14* (2006.01)
*H01J 5/16* (2006.01)
*H01J 40/14* (2006.01)

(52) U.S. Cl. .................. 250/231.13; 250/216; 359/641

(58) Field of Classification Search ...............................
250/231.13–231.14, 231.16–231.18, 216;
33/1 PT; 341/11, 13; 356/614; 359/641
See application file for complete search history.

(56) References Cited

U.S. PATENT DOCUMENTS 4,385,234 A * 5/1983 Johnson .................... 250/231.1

* cited by examiner

*Primary Examiner*—Stephone B. Allen
*Assistant Examiner*—Patrick J. Lee
(74) *Attorney, Agent, or Firm*—Hodgson Russ LLP

(57) ABSTRACT

An unsealed optical encoder does not function properly in a fluid other than air because the optics do not function when interfaced with a medium having an index of refraction significantly higher than air. The collimating lens of an optical encoder has two refracting surfaces, at least one of the refracting surfaces being convex. An orthogonal cap of the present invention is attached over an optical encoder's collimating lens to create a sealed air cavity between the convex refracting surface of the collimating lens and the orthogonal cap. This placement of the orthogonal cap is such that the collimated light leaving the sealed air cavity may enter the surrounding medium at an angle that is normal to the surface of the medium, such as transparent oil, so that the collimated light does not bend even though the light is traveling from air to a much slower medium.

6 Claims, 3 Drawing Sheets

METHOD FOR OPTIMIZING PERFORMANCE OF OPTICAL ENCODERS OPERATING IN A FLUID

CROSS REFERENCE TO A RELATED APPLICATION

This application is a division of application Ser. No. 10/314,071 filed Dec. 6, 2002 now U.S. Pat. No. 6,900,428 entitled "Method For Optimizing Performance Of Optical Encoders Operating In A Fluid" and upon which the benefit 35 USC 120 is claimed.

BACKGROUND OF THE INVENTION

Optical encoders are essential to many position-sensing devices used today to detect both linear motion and rotary motion. Typically, an optical encoder is comprised of two major subassemblies: a code disc and a sensing element. The code disc for linear optical encoders is frequently called a code strip. Most optical encoders, however, are rotary optical encoders that utilize a flat wheel having transparent windows as the code disc. The transparent windows are usually perforations that allow for the passage of light, the perforations being aligned in patterns around a central axis. The sensing elements of most rotary optical encoders are photodetectors that detect a light source when it passes through the transparent windows of a code disc. Very commonly, the light source is a light emitting diode (LED) because of the low cost and nearly monochromatic quality of the emitted light. When the code disc is rotated about its central axis, such as when it is attached to the shaft of a motor, the code disc blocks the light source unless a transparent window allows for the passage of light. Each time the light source passes through a moving transparent window, a pulse of light emerges, but is cut off when the code disc abruptly blocks the light source. Photodetectors count the number of light pulses that are generated by the rotating code disc, thereby determining the position of a particular object. In the example of a motor shaft, the rotary optical encoder is capable of precisely determining the number of rotations of the motor.

The light source in an optical encoder must be collimated so that the emitted light can be uniformly directed at the sensing element. A collimating lens that is external to the light source most commonly performs collimation of the light source. The collimating lens's shape is determined by the relative indices of refraction between the lens material and the surrounding medium. Until now, optical encoders have been designed for operation in air, so the lens's shape assumes that the medium surrounding the lens will be air. For applications where the position of a device in a fluid must be determined, optical encoders are equipped with seals that prevent any liquids from entering a fully encased optical encoder.

Shaft seals, designed to protect against contamination and moisture in the environment, are currently viewed as necessary when an optical encoder needs to be protected against contamination from liquids. If optical encoders are not sealed, there is a significant degradation of performance when liquids disrupt the optical components. O-ring seals are also highly recommended for all points of entry were fluids might seep into the encoder, usually being required around screws that hold the optical encoder's case together and properly mounted. In addition to the expense of sealing such an optical encoder, shaft seals impose additional load on the motor, or other force, that ultimately drives the code disc. If any one seal breaks, the optical encoder will stop working properly. The method of the present invention is a more reliable approach that significantly cuts costs and that does not add any drag to the motor.

SUMMARY OF THE INVENTION

The method of the present invention eliminates the need for costly and sometimes unreliable sealing methods, including encasements, o-rings and shaft seals. Rather, the method of the present invention is unaffected by the presence of many liquids and, in fact, is ideally suited for applications where the entire encoder is filled and surrounded by a liquid. The electronics of an optical encoder are not affected by the presence of a nonconductive fluid, such as oil. Submersion in oil actually protects the encoder from the harmful effects of moisture, dirt and debris. The optics, however, do not function properly in a liquid that has an index of refraction significantly higher than that of air because the light source is not properly collimated.

The most preferred embodiment of the present invention is a method of retrofitting an existing optical encoder so that it functions in a nonconductive fluid that has optical qualities similar to those of water. An orthogonal cap is attached over the optical encoder's collimating lens so that there is a small air gap between the convex end of the collimating lens and the orthogonal cap. This placement of the orthogonal cap allows the optical encoder to collimate the light source in air, as designed, but now the entire optical encoder, including the optics, will function properly when completely submerged in an appropriate fluid. The placement of the orthogonal cap is such that the collimated light traveling in the air gap will hit the fluid at an angle that is normal to the surface of the fluid so that the collimation of the light is not affected by the change in indices of refraction.

DETAILED DESCRIPTION OF THE INVENTION

For a complete understanding of the method of the present invention, it is necessary to briefly describe the function and structure of an optical encoder. An optical encoder is a digital motion transducer, usually utilizing digitized square waves for incremental angular counting. The device generates a series of pulses in proportion to movement. A moving disc with a pattern of transparent windows moves in front of a light source and intercepts the transmitted light beam. The light that passes through the moving disc is detected by a photosensor that provides the transducer output. Both displacement and velocity of the moving disc may be sensed by either pulse counting or pulse timing. An incremental encoder measures either the speed or relative position by monitoring the frequency or number of pulses generated by the encoder. An absolute encoder is capable of measuring precise position.

Figure 1:
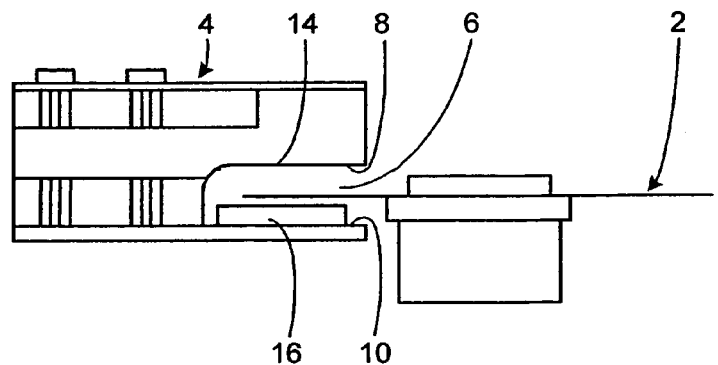
FIG. 1 is a side elevation view of a BEI Duncan MOD 700 Series optical encoder.
Figure 2:
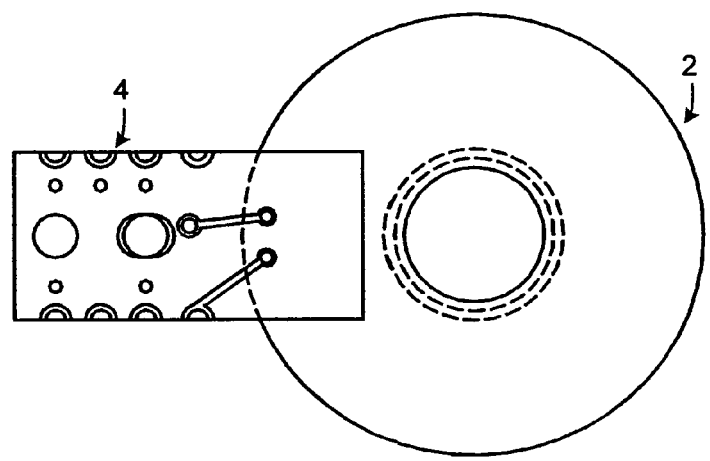
FIG. 2 is a plan view of the optical encoder of FIG. 1.
Figure 3:
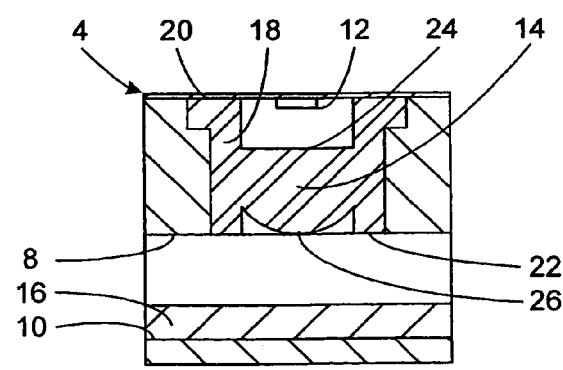
FIG. 3 is a cross-sectional elevation of the caliper of the optical encoder of FIG. 1, through a diameter of the collimating lens.

Because there are so many optical encoders available, one representative example has been chosen for the purpose of explanation, but not limitation: BEI Duncan Electronics Division of BEI Technologies, Inc., offers low-profile rotary incremental optical encoders as part of the BEI Duncan MOD 700 Series. These optical encoders are very basic and do not include cases, seals or o-rings that the present invention does not require. The MOD 700, exemplified in FIGS. 1–3, is comprised of a code disc 2 and a caliper 4. The caliper has a groove 6 with first opposing surface 8 and second opposing surface 10. Part of the code disc passes through the caliper, sandwiched between the opposing surfaces, so that only a fraction of the total degrees of arc of rotation of the disc are represented in the groove at any one time. The first opposing surface of the caliper supports the light source 12 and collimating lens 14, while the second opposing surface of the caliper supports the photodetector(s) 16.

The first opposing surface 8 of the caliper 4 has a mounted light emitting diode, or LED, as the light source 12. A continuous flow of current through an LED results in a continuous stream of nearly monochromatic light. By using a monochromatic light source, diffraction of the light source can be controlled and accurate. The light source should be directed at the code disc 2 so that it is substantially perpendicular to a flat surface of the code disc. Directing the light source is accomplished through the use the collimating lens 14. If the light is not collimated, it may hit the code disc at various angles and interfere with the photodetector's 16 ability to accurately process the detected light, such as by level detection or edge detection, to provide a clean sequence of pulses.

Figure 4:
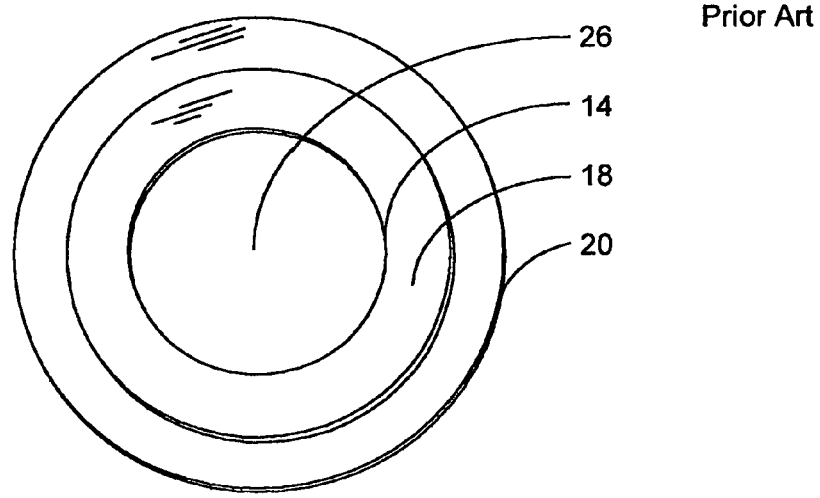
FIG. 4 is a plan view of the convex end of the collimating lens of FIG. 3.

FIGS. 3 and 4 show the collimating lens 14 on the MOD 700, a plano-convex lens. There is a lens tube 18, with a base end 20 and crown end 22, around the perimeter of the collimating lens that protects the refracting surfaces of the lens. The base end of the lens tube provides a means for mounting the collimating lens to the caliper, and a standoff means so that the collimating lens does not crush the LED during assembly. The first refracting surface 24 of the collimating lens, closest to the light source 12, is flat. The second refracting surface 26, farthest from the light source, is curved. Snell's Law determines the curvature of the lens's second refracting surface.

Snell's Law is frequently summarized as: sin(angle of incidence)/sin(angle of refraction)=n2/n1, where "n1" and "n2" are the indices of refraction in the first and second medium, respectively. When a light source travels from a low index of refraction medium to a higher index of refraction medium, such as from air to glass, the light is bent toward the normal to the surface. Conversely, light is bent away from the normal to the surface when traveling from glass to air. Also, if the angle of incidence is normal to the surface, the light doesn't bend. Some common indices of refraction are: n(air)=1.0003, n(water)=1.33, and n(glass)=1.5. Because the indices of refraction of many oils are close to the index of refraction of many lens-making materials, it can be difficult to make a lens that will collimate the light source in oil. In addition to such a lens having a very severe curvature, the lens would only collimate the light in a select few different mediums.

Figure 5:
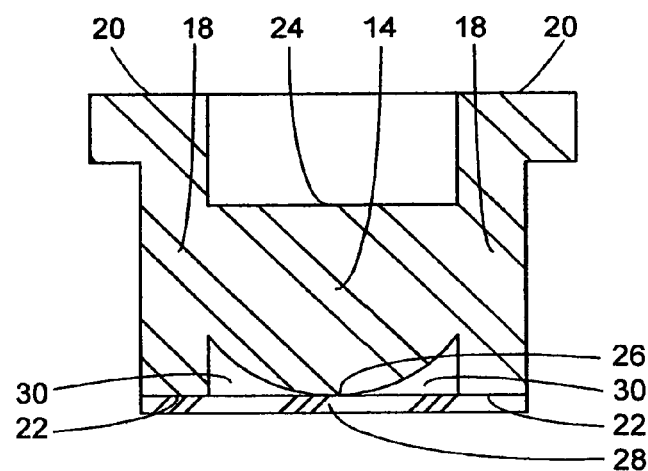
FIG. 5 is a cross-sectional elevation through a diameter of the collimating lens of FIG. 3, modified to include the orthogonal cap of the present invention.
Figure 6:
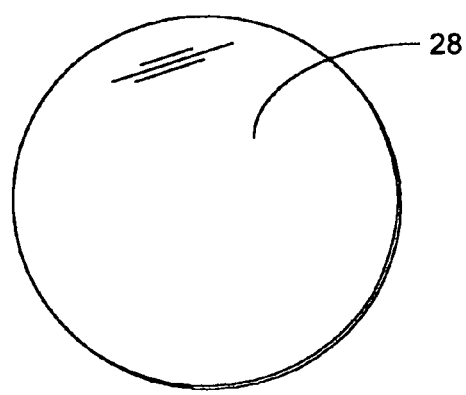
FIG. 6 is a plan view of the lens assembly used in FIG. 5

The method of the present invention allows the lens to correctly collimate the light, requiring only a minimal curvature on the second refracting surface 26 of the collimating lens 14, because the light is collimated when it travels from the collimating lens material to air. Once collimated, the light may enter virtually any transparent material without any further bending so long as the light enters at an angle that is normal to the surface of the material. The method of the present invention creates this situation with an orthogonal cap, shown in FIGS. 5 and 6 at 28, that is secured to the crown end 22 of the lens tube 18, thus creating a sealed air cavity 30 containing collimated light.

The orthogonal cap 28 is a transparent lens cover that is fixed and sealed where the orthogonal cap contacts the crown end 22 of the lens tube 18. Preferably, the orthogonal cap is formed from a substantially flat sheet of transparent material that is rigid and has a uniform thickness. The most preferred material for the orthogonal cap is clear polycarbonate, such as the materially commercially available under the tradename Lexan. The thickness of material used is somewhat arbitrary so long as the orthogonal cap does not interfere with the operation of the optical encoder. The main concern will usually be clearance between the orthogonal cap and the code disc 2.

Proper positioning of the orthogonal cap 28 will place it perpendicular to the propagation of the collimated light. Usually, the base end 20 and crown end 22 of the lens tube 18 terminate in planes that are parallel to the plane of the first refracting surface 24 of the collimating lens 14. Although the lens tube is designed to protect the refracting surfaces of the lens, the planes of the base end and crown end of the lens tube can be exploited for the purpose of positioning the orthogonal cap. Because the bottom of the lens tube's base end is parallel to the first refracting surface of the collimating lens and also parallel to the plane of the lens tube's crown end, proper positioning of the orthogonal cap simply requires that the lens tube's crown end creates a seal with the orthogonal cap.

Some error in the positioning of the orthogonal cap 28 is acceptable. Because substantially all of the collimated light strikes the orthogonal cap at the same angle, and the orthogonal cap is substantially flat, any bending of light will be substantially in the same direction and of the same magnitude. The collimated light remains collimated and focused, so the photodetectors will detect a consistent light source that will result in a clean sequence of pulses.

The recommended method, which is not intended to limit the claimed invention, is for modifying the MOD 700 as follows: Remove the collimating lens 14 from the first opposing surface 8 of the caliper 4, such as by prying it off with a blade or screwdriver, being careful to not damage the LED 12. If the crown end 22 of the lens tube 18 contains nicks or cuts, use a 5% polycarbonate solvent blend solution to fill any gaps. Align an orthogonal cap 28 over the crown end of the lens tube. The orthogonal cap is preferably 0.010±0.002 inch thick Lexan with a diameter of 0.215±0.007 inches. Hold the orthogonal cap in place with tweezers, against the lens tube's crown end, while a Pasteur pipette is dipped in polycarbonate solvent and then gently touched to the edge of the orthogonal cap. The solvent will wick through the joint and create a very clear interface as it creates the solvent weld. Small bubbles in the solvent weld are acceptable, but there must be no leak paths through the weld area. Do not blow on the solvent weld while it is drying as this may cause flash blushing. Allow this assembly to air dry for at least 12 hours. Use a suitable epoxy to re-attach the lens assembly to the caliper.

Figure 7:
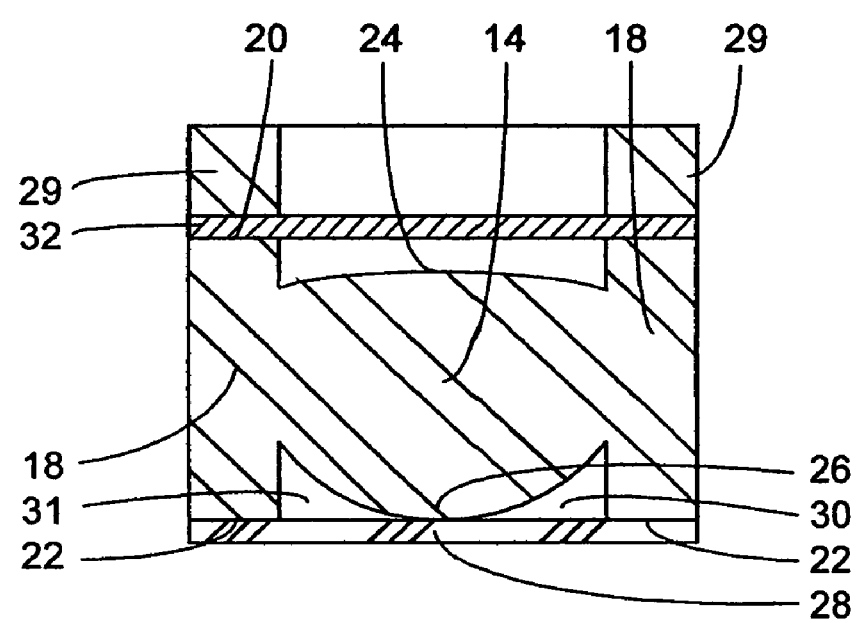
FIG. 7 is a cross-sectional elevation through a diameter of a bi-convex collimating lens, modified to include two orthogonal caps of the present invention.

Additional steps may be required for different lens assemblies. For example, if the lens is bi-convex, as in FIG. 7, the first refracting surface 24 of the collimating lens 14 will also need an orthogonal cap. Most likely, the base end 20 of the lens tube 18 provides a standoff means that prevents the first refracting surface from crushing the LED. This standoff means must be recreated between the additional orthogonal cap 29 and the first opposing surface of the caliper. It may be necessary to shorten the stand-off means attached to the lens tube, by evenly cutting it off, so that there is adequate clearance between the lens assembly and the code disc once the recreated stand-off means 32 is added to the lens assembly. The purpose of the additional orthogonal cap is, as before, to create a sealed air cavity 31 that allows the light emanating from the LED to be properly collimated in air. A bi-convex lens will, therefore, require two orthogonal caps that create two sealed air cavities.

For collimating lenses that do not have a lens tube that provides a suitable mounting surface for the orthogonal cap, the perimeter of the orthogonal cap should include a cylinder wall that extends to the perimeter of the collimating lens such that an air cavity will be created, as already described, and the refracting surfaces of the collimating lens will not be significantly disturbed by the presence of the cylinder walls. Essentially, the lens will be placed in a clear polycarbonate cylinder with flat end caps so that the lens assembly will look similar to the lens assembly of FIG. 5. The lens assembly may then be positioned within the optical encoder so that the encoder will function properly when submerged in oil.

While a preferred form of the invention has been shown and described, it will be realized that alterations and modifications may be made thereto without departing from the scope of the following claims. For example, mass production of lens assemblies will not require that old lenses be re-used. Also, a lens assembly according to the present invention may be used in the production of new optical encoders. Additionally, if the fluid in which an optical encoder is intended to be submerged may cause damage to components of the optical encoder, such as exposed electrical connections or photosensors, a coating of silicone, urethane, or other suitable material may be used so that an optical encoder according to the present invention will operate submerged in numerous other fluids, such as water.

What is claimed is:

1. An optical encoder, capable of functioning while submersed in a fluid, comprising:
   a caliper;
   a code disc;
   a sensing element;
   a light source;
   a collimating lens, with a first refracting surface and a second refracting surface, that properly collimates light from the light source when at least one of the refracting surfaces is substantially interfaced with a medium of air; and
   a first orthogonal cap that creates a first sealed air cavity between one of the collimating lens's refracting surfaces and the first orthogonal cap, the first orthogonal cap being a substantially transparent sheet of non-focusing material that substantially lies in a plane that is perpendicular to the propagation of collimated light.

2. The optical encoder of claim 1 further comprising a lens tube that substantially surrounds a circumference of the collimating lens such that a height of the lens tube is parallel to the propagation of the collimated light, the lens tube having a crown end and a base end that each lie in planes that are perpendicular to a height of the lens tube, the crown end being closest to the second refracting surface and the base end being closest to the first refracting surface, the crown end being fixed to the first orthogonal cap so that at least part of the lens tube functions as a wall for the first sealed air cavity.

3. The optical encoder of claim 2 further comprising a second orthogonal cap that is fixed to the base end of the lens tube so that at least part of the lens tube functions as a wall for a second sealed air cavity.

4. The optical encoder of claim 2 wherein the first orthogonal cap is a substantially clear sheet of polycarbonate material having a uniform thickness.

5. The optical encoder of claim 4 wherein the first orthogonal cap is fixed to the crown end of the lens tube by a polycarbonate solvent weld.

6. The optical encoder of claim 1 wherein the caliper is coated with a material that protects the optical encoder against conductive fluids.

* * * * *